US012592886B2

(12) United States Patent
Ponnuru et al.

(10) Patent No.: US 12,592,886 B2
(45) Date of Patent: Mar. 31, 2026

(54) SYSTEMS AND METHODS FOR STATELESS SYMMETRIC FORWARDING

(71) Applicant: Cisco Technology, Inc., San Jose, CA (US)

(72) Inventors: Laxmikantha Reddy Ponnuru, San Ramon, CA (US); Samir Thoria, Saratoga, CA (US); Arul Murugan Manickam, San Jose, CA (US); Ram Dular Singh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 519 days.

(21) Appl. No.: 17/813,410

(22) Filed: Jul. 19, 2022

(65) Prior Publication Data

US 2024/0031288 A1     Jan. 25, 2024

(51) Int. Cl.
*H04L 45/7453*         (2022.01)
(52) U.S. Cl.
CPC ................................. *H04L 45/7453* (2013.01)
(58) Field of Classification Search
CPC .................................................. H04L 45/7453
See application file for complete search history.

(56) References Cited

U.S. PATENT DOCUMENTS

| | | | | |
|---|---|---|---|---|
| 11,425,056 | B1 * | 8/2022 | Kumar ..................... | H04L 45/34 |
| 2009/0204981 | A1 | 8/2009 | Karino et al. | |
| 2010/0023726 | A1 * | 1/2010 | Aviles ................. | H04L 67/1097 |
| | | | | 711/216 |
| 2011/0069714 | A1 | 3/2011 | Le Pennec et al. | |
| 2013/0227166 | A1 | 8/2013 | Ravindran et al. | |
| 2016/0142295 | A1 * | 5/2016 | Parsa ................... | H04L 45/7453 |
| | | | | 370/392 |
| 2018/0054475 | A1 * | 2/2018 | Agarwal ............. | H04L 67/1097 |
| 2020/0036624 | A1 * | 1/2020 | Michael ............... | H04L 45/123 |
| 2021/0044625 | A1 | 2/2021 | Panchalingam et al. | |
| 2021/0409319 | A1 | 12/2021 | Mithyantha | |

FOREIGN PATENT DOCUMENTS

| | | |
|---|---|---|
| CN | 1725702 A | 1/2006 |
| WO | 2021103744 A1 | 6/2021 |

OTHER PUBLICATIONS

International Search Report and Written Opinion for International Application No. PCT/US2023/027635, mailed Oct. 18, 2023, 18 Pages.

* cited by examiner

*Primary Examiner* — Michael Thier
*Assistant Examiner* — Tracy Lauren Raimondo
(74) *Attorney, Agent, or Firm* — Baker Botts L.L.P.

(57)         ABSTRACT

A system of one embodiment that provides stateless symmetric forwarding of packets in a computer network. The system includes a memory and a processor. The system is operable to determine a cluster state of a plurality of border routers in a cluster. The system is operable to communicate the cluster state to at least one branch node in the computer network. The system is operable to generate a network level consistent hash based on the cluster state. The system is operable to route a first packet through a first border router of the plurality of border routers in the cluster using the network level consistent hash. After the first packet is sent through a first border router, the system is further operable to route a second packet through the first border router of the plurality of border routers in the cluster using the network level consistent hash.

20 Claims, 5 Drawing Sheets

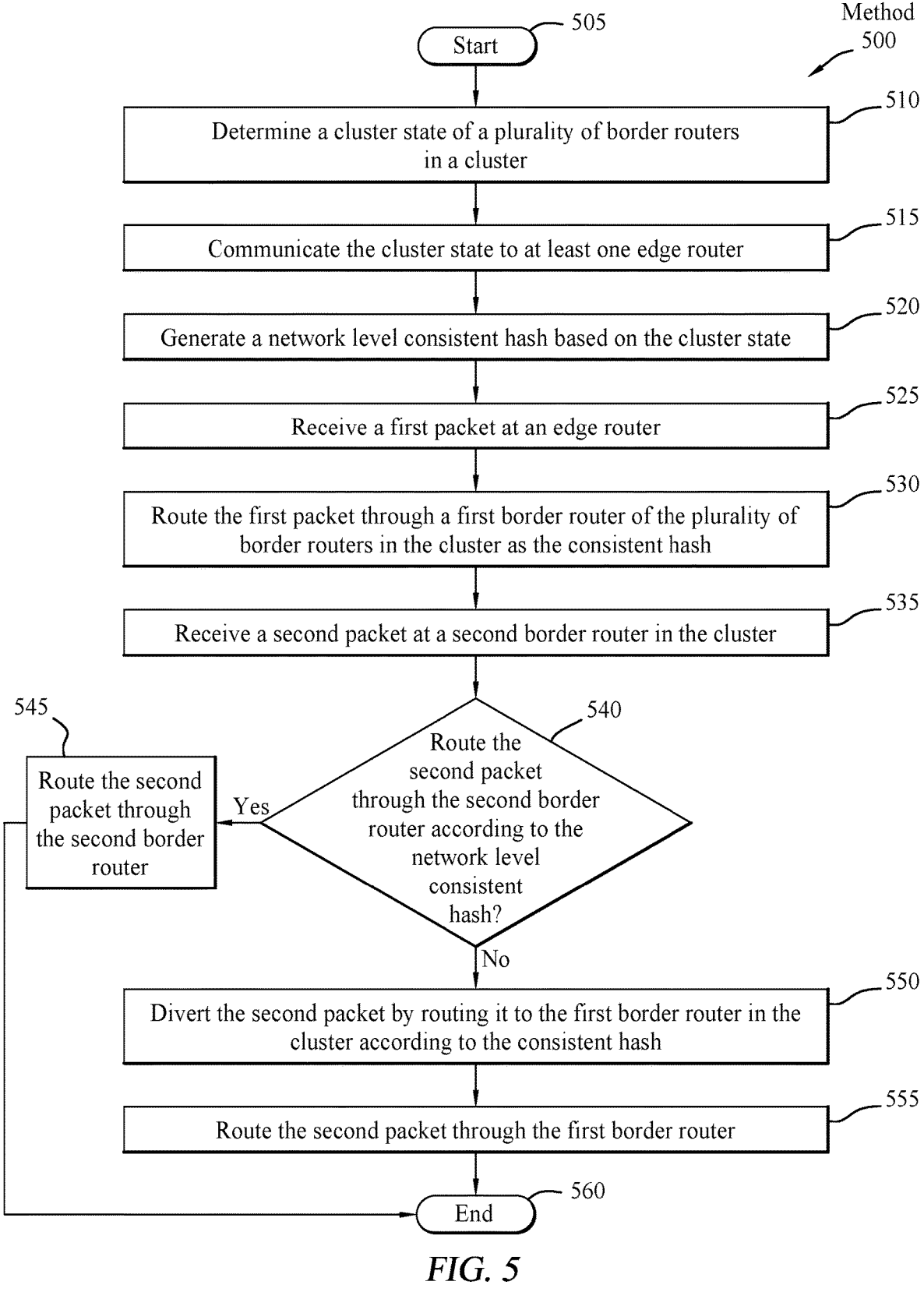

Method 500

Start 505

Determine a cluster state of a plurality of border routers in a cluster 510

Communicate the cluster state to at least one edge router 515

Generate a network level consistent hash based on the cluster state 520

Receive a first packet at an edge router 525

Route the first packet through a first border router of the plurality of border routers in the cluster as the consistent hash 530

Receive a second packet at a second border router in the cluster 535

Route the second packet through the second border router according to the network level consistent hash? 540

Route the second packet through the second border router 545

Yes

No

Divert the second packet by routing it to the first border router in the cluster according to the consistent hash 550

Route the second packet through the first border router 555

End 560

FIG. 5

SYSTEMS AND METHODS FOR STATELESS SYMMETRIC FORWARDING

TECHNICAL FIELD

The present disclosure relates generally to communication networks, and more specifically to systems and methods for stateless symmetric forwarding in a computer network.

BACKGROUND

A Multi-Region Fabric (MRF) comprises regional networks (or overlays) that are interconnected by a Software-Defined Wide Area Network (SD-WAN) router called a border router. Border routers provide inter-region connectivity by interconnecting the regional networks or overlays to a common core network. Typically, there will be multiple border routers hosted as a cluster in a regional point of presence (POP) or a colocation site (colo site), and the multiple border routers are operated in an all-active fashion. Because there are multiple border routers in each cluster, packets may be routed asymmetrically through different border routers in a cluster.

BRIEF DESCRIPTION OF THE DRAWINGS

For a more complete understanding of the present disclosure and for further features and advantages thereof, reference is now made to the following description taken in conjunction with the accompanying drawings, in which:

FIG. 5 illustrates an example method for stateless symmetric forwarding of packets through a cluster connected to two different types of computer networks, according to some embodiments of the present disclosure.

DESCRIPTION OF EXAMPLE EMBODIMENTS

Overview

Figure 1:
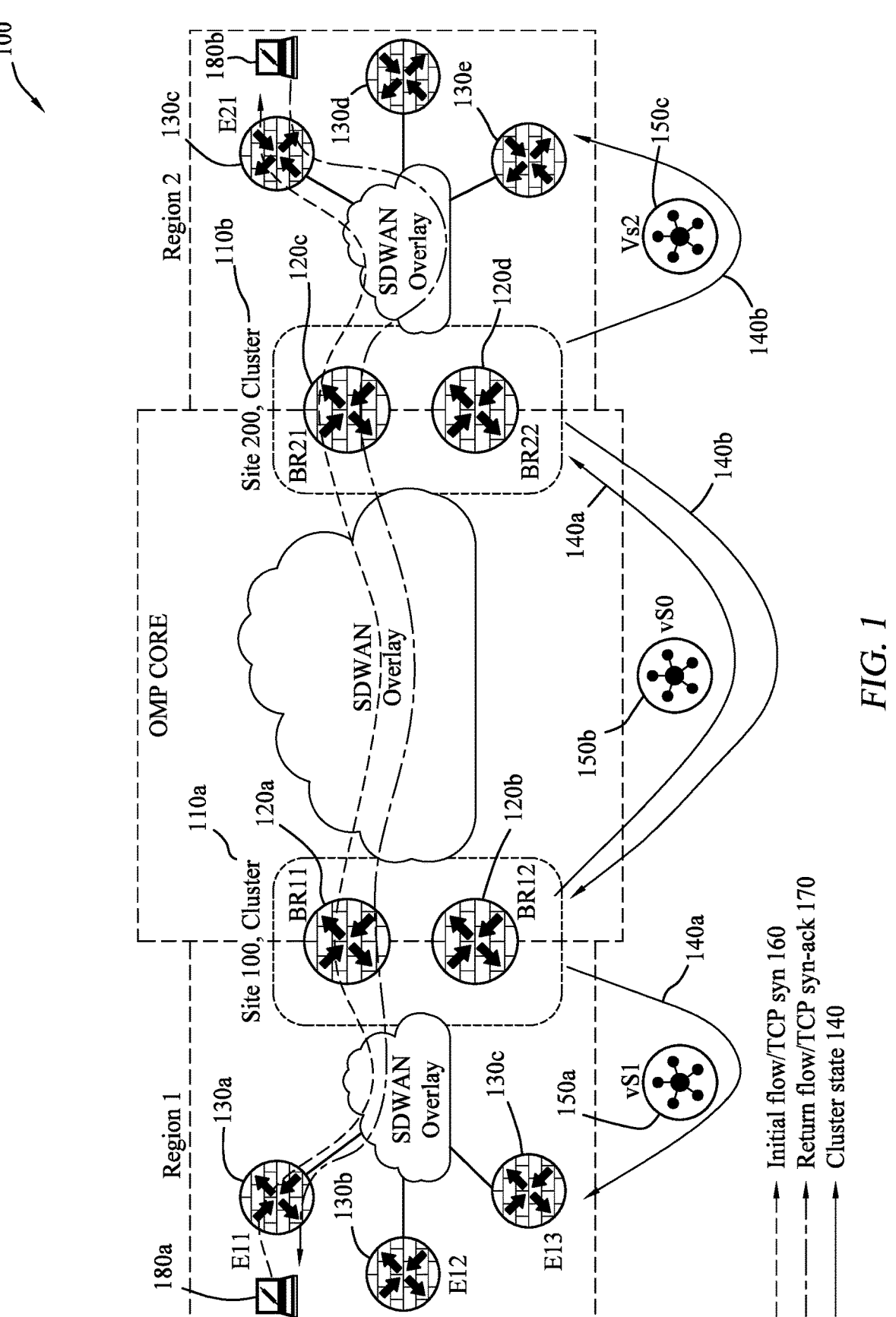
FIG. 1 illustrates an example computer network that provides stateless symmetric forwarding of packets through clusters containing a plurality of border routers.

According to one embodiment of the present disclosure, a system provides stateless symmetric forwarding of packets in a computer network. The system includes a memory and a processor. The system determines a cluster state of a plurality of border routers in a cluster. The system then communicates the cluster state to at least one branch node in the computer network. The system generates a network level consistent hash based on the cluster state routes a first packet through a first border router of the plurality of border routers in the cluster using the network level consistent hash. After the first packet is sent through a first border router, the system routes a second packet through the first border router of the plurality of border routers in the cluster using the network level consistent hash.

According to one embodiment of the present disclosure, a method provides stateless symmetric forwarding of packets through a cluster that interconnects two different types of computer networks. The method includes determining a cluster state of a plurality of border routers in a cluster and communicating the cluster state to at least one branch node. The method includes generating a network level consistent hash based on the cluster state and routing a first packet from a first computer network through a first border router of the plurality of border routers in the cluster using the network level consistent hash. After the first packet is sent through a first border router to a second computer network, a second packet that is received by a second border router is diverted from the second computer network by routing the second packet from the second border router in the cluster to the first border router in the cluster using the network level consistent hash.

Certain embodiments of the disclosure may provide one or more technical advantages. A technical advantage of one embodiment may allow for reduced memory usage by border routers by not requiring each border router in a cluster to store the flow state of each flow of data through the cluster in order to symmetrically route each flow. Instead, the present disclosure uses less memory by routing each flow according to a network level consistent hash. Since certain embodiments of the present disclosure do not require the storage of each flow state in each border routers, these embodiments are less complex, easier to use, easier to debug, and will have optimal memory usage. Certain embodiments may allow for high flow scale through border routers because of the reduced memory usage of the border routers. Some of 28 embodiments may allow for the dynamic addition and deletion of border routers in a cluster that can make these embodiments easier to operationalize compared to traditional cluster designs. Another technical advantage of certain embodiments in this disclosure is that the use of a network level consistent hash may enable better load balancing when more border routers are dynamically added or deleted from a cluster. One or more other technical advantages may be readily apparent to one skilled in the art from the figures, descriptions, and claims included herein.

Example Embodiments

A Multi-Region Fabric (MRF) comprises regional networks (or overlays) that are interconnected by a Software-Defined Wide Area Network (SD-WAN) router called a border router. Border routers provide inter-region connectivity by interconnecting regional networks or overlays to a common core network. Typically, there will be multiple border routers hosted as a cluster in a regional point of presence (POP) or a colocation site (colo site), and the multiple border routers are operated in an all-active fashion. Because there are multiple border routers in each cluster and there are multiple paths through different border routers end-to-end, packets may be routed asymmetrically through different border routers in a cluster. This asymmetrically routed flow of traffic may break stateful features like a firewall, Virtual Private Network (VPN), or Deep Packet Inspection (DPI). These features when enabled need to see both directions of the flow, for example, from a client to a server and vice-versa. Typically, the asymmetric routed traffic forwarding issue with stateful application is solved by storing a flow state sync that provides the flow-owner border router information so that a non-owner border router may divert the asymmetrically routed traffic to the correct owner border router. However, this solution is very complex and requires extra memory to store flow state in the non-owner border router that in turn results in a lower flow scale even with a cluster of multiple nodes.

The present disclosure describes embodiments that are directed to providing a solution to the above problems by using a network level consistent hash to symmetrically route traffic through a border router in a cluster of a plurality of border routers. The present disclosure solves many of the issues of relying on stateful symmetric routing to fix the asymmetric routing issue. The present disclosure provides systems and methods that allow for a flow of traffic to be symmetrically routed through a border node while not requiring the state of the flow to be stored in each border router in a cluster. Because the present disclosure is stateless, symmetric flow of traffic through a border router in a cluster may be achieved with little to no impact on memory. Therefore, the present disclosure allows for greater scaling of a cluster given that there is less complexity and less memory usage.

FIG. 1 is an illustration of an example computer network 100 that provides stateless symmetric forwarding of packets through clusters containing a plurality of border routers. In the illustrated embodiment, network 100 comprises two regional networks and a core network labeled "OMP Core." Each regional network is interconnected to the core network via two clusters 110. Each cluster 110 comprises a plurality of border routers 120. A SD-WAN overlay interconnects a plurality of edge routers 130 with each cluster 110. In the illustrated embodiment, branch nodes 180 are connected to one or more edge routers 130. According to the illustrated embodiment, cluster states 140 of each cluster 110 are communicated via one or more controllers 150 to one or more edge routers 130 and one or more clusters 110. In the illustrated embodiment, an initial flow 160 of traffic is routed from a first branch node 180a through a first edge router 130a. Then the initial flow 160 of traffic is routed from the first edge router 130a through a first border router 120a, then through a second border router 120c, and then through a second edge router 130d to a second branch node 180b. Upon receiving the initial flow 160 of traffic, the second branch node 180b routes return flow 170 from the second branch node 180b through the second edge router 130d. Then the return flow 170 of traffic is routed from the second edge router 130d through the second border router 120c, then through the first border router 120a, and then through the first edge router 130a to the first branch node 180a.

Border routers 120 represent any suitable network device that facilitates communication between endpoints in a first network and endpoints in a second network. Border routers may include border routers and edge routers. Border routers may be interconnected to endpoints in each network by the public Internet, a multiprotocol label switching (MPLS) virtual private network (VPN), Software-Defined Wide Area Network (SD-WAN), or the like. In some embodiments, border routers represent any suitable network device that facilitates communication between end points in a first region of a network and a second region of a network. In some embodiments, border routers represent any suitable network device that facilitates communication between endpoints in a first network and a core network. In those embodiments, a core network may include an overlay management protocol (OMP) core network.

Cluster 110 represents any grouping of two or more border routers 120. Cluster 110 may include colocation sites (colo sites), regional point of presence (POP) sites, data centers, internet service provider (ISP) POP sites, internet exchange points, or the like. In some embodiments, cluster 110 is operated by an ISP. In other embodiments, cluster 110 is operated by a single organization within a single network. In certain embodiments, cluster 110 is located between two different networks. In other embodiments, cluster 110 is located between different regions of the same network. In some embodiments, cluster 110 comprises a plurality of border routers 120 in one device such as, for example, a server. In other embodiments, cluster 110 comprises a plurality of border routers 120 in separate devices, but in the same location.

Edge routers 130 represent any suitable network device that facilitates communication between one or more branch nodes 180 and one or more endpoints in a computer network. Edge routers 130 may include edge routers, access routers, branch routers, or the like. Edge router 130 may be interconnected to endpoints in a network by the public internet, a MPLS VPN, SD-WAN, SD-WAN overlay, WAN, LAN, or the like. Edge router 130 may communicate to branch node 180 through either wired or wireless connections. Edge router 130 may communicate via Transmission Control Protocol (TCP), User Datagram Protocol (UDP), or any suitable other networking protocol.

Branch nodes 180 represent any suitable device that is capable of connecting to network 100. Branch node 180 may include other routers, servers, end-user devices such as laptops, phones, tablets, and any other suitable device capable of connecting to a network. Branch node 180 may comprise one or more network interfaces, at least one processor, and a memory that is interconnected by a system bus as well as a power supply. In some embodiments, branch nodes 180 represent devices that are capable of running an application or groups of applications on computer network 100 and include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. Branch nodes 180 may also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

Cluster state 140 represents any suitable data type that indicates information regarding cluster 110. Cluster state 140 may include integer values, string words, or any other data type that is capable of conveying information regarding cluster 110. For example, in a two node all-active cluster as illustrated in FIG. 1, cluster state 140 may comprise data such as "BR11 is active" and "BR12 is active" where "BR11" represents one of the border routers 120 in cluster 110 and "BR12" represents the other border router 120 in cluster 110. In some embodiments, cluster state 140 may comprise data or information that indicates that the cluster state has changed. A cluster state may change when border router 120 in cluster 110 is added or deleted from cluster 110. For example, if border router 120 is removed from cluster 110, cluster state 140 may comprise data such as "BR12 is removed from cluster." In some embodiments, cluster state 140 may comprise data or information merely indicating the number of active border routers 120 in cluster 110. For example, cluster state 140 may comprise data such as "2."

Controller 150 represents any suitable network device that facilitates building and maintaining a network topology and making decisions on where traffic flows in network 100. Controller 150 may include one or more physical or virtual network controller appliances. Controller 150 may include devices such as a physical or virtual Cisco® SD-WAN vSmart controller. In some embodiments, controller 150 may establish secure connections to each device in network 100 and distribute route and policy information via a control plane protocol. The control plane protocol may include Overlay Management Protocol (OMP), Open Shortest Path First (OSPF), Intermediate System to Intermediate System (IS-IS), Border Gateway Protocol, Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc. In certain embodiments, controller 150 is capable of communicating cluster state 140 of cluster 110 in network 100 to any device in network 100. In some embodiments, controller 150 only communicates cluster state 140 to edge routers 130 and to border routers 120 in clusters 110. In some embodiments, controller 150 may operate as route reflectors. Controller 150 may also orchestrate secure connectivity between and among the devices in the network. For example, in some embodiments, controller 150 may distribute crypto key information among the network device(s). This allows the network to support a secure network protocol or application (e.g., Internet Protocol Security (IPSec), Transport Layer Security (TLS), Secure Shell (SSH), etc.) without Internet Key Exchange (IKE) and enable scalability of the network.

Initial flow 160 represents any suitable flow of data packets, traffic, or messages that may be exchanged among the devices of computer network 100 from first branch node 180a to second branch node 180b. Initial flow 160 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In the illustrated embodiment, initial flow 160 is exchanged over a link of devices in network 100 using a TCP protocol performing the first step of a TCP three-way handshake. In particular, in the illustrated embodiment, initial flow 160 uses a TCP syn message type, which is used to initiate and establish a connection between the first branch node 180 and the second branch node 180.

Return flow 170 represents any suitable flow of data packets, traffic, or messages that may be exchanged among the devices of computer network 100 from second branch node 180b to first branch node 180a in response to receiving the initial flow 160. Return flow 170 may be exchanged over links using predefined network communication protocols such as TCP/IP, UDP, ATM protocol, Frame Relay protocol, or any other suitable protocol. In the illustrated embodiment, return flow 170 is exchanged over a link of devices in network 100 using a TCP protocol performing the second step of a TCP three-way handshake. In the illustrated embodiment, return flow 170 is using a TCP syn-ack message type, which is used to initiate and establish a connection between second branch node 180b and first branch node 180a.

In an exemplary embodiment of operation, controller 150a determines cluster state 140a of border routers 120a and 120b in cluster 110a. For example, in the illustrated embodiment, cluster state 140a in cluster 110a is two active border routers 120a and 120b. Controller 150a communicates cluster state 140a to edge routers 130a-c Similarly, controller 150b also communicates cluster state 140a to border routers 120c and 120d in cluster 110b. Controller 150c determines cluster state 140b of the border routers 120c and 120d in cluster 110b. Controller 150c communicates cluster state 140b to edge routers 130d-f. Similarly, controller 150b also communicates cluster state 140b to border routers 120a and 120b. Then each edge routers 130a-f and border routers 120a-d generate a consistent hash table based on cluster state 140 that was communicated to them by controllers 150a-c. The process to generate a consistent hash table based on cluster states 140 is discussed in more detail below. According to some embodiments, each consistent hash table, when given an incoming packet as input, routes the packet to a specific owner border router 120 in cluster 110 based on the consistent hash.

In the exemplary embodiment of operation, an initial flow 160 begins when edge router 130a receives a packet from branch node 180a. Edge router 130a uses initial flow's five-tuple as a key to perform a consistent hash lookup according to the consistent hash table generated by edge router 130a. Using the results of the consistent hash lookup, edge router 130a forces the routing of initial flow 160 to go to border router 120a of cluster 110a. Similarly, border router 120a uses the initial flow's five-tuple as a key to perform a consistent hash lookup according to the consistent hash table generated by border router 120a. Using the results of the consistent hash lookup, border router 120a forces the routing of initial flow 160 to go to border router 120c of cluster 110b. Border router 120c uses the initial flow's five-tuple as a key to perform a consistent hash lookup according to the consistent hash table generated by border router 120c. A five-tuple refers to a set of five different values that comprise a TCP/IP connection, including a source IP address, source port number, destination IP address, destination port number, and the protocol in use. Using the results of the consistent hash lookup, border router 120c forces the routing of initial flow 160 to go to edge router 130d. Edge router 130d may then route initial flow 160 to the destination device, which would be branch node 180b in the illustrated embodiment. In some embodiments, initial flow 160's five-tuple is based on one of initial flow 160's packets.

Still according to the exemplary embodiment of operation, a return flow 170 begins when edge router 130d receives TCP syn-ack response message from branch node 180d. Edge router 130d uses the return flow's five-tuple as a key to perform a consistent hash lookup according to the consistent hash table generated by edge router 130d. Using the results of the consistent hash lookup, edge router 130d forces the routing of return flow 170 to go to border router 120c of cluster 110b. Using the consistent hash lookup will result in the return flow being symmetrically routed through the same border router 120c that initial flow 160 used. Similarly, border router 120c uses the return flow's five-tuple as a key to perform a consistent hash lookup according to the consistent hash table generated by border router 120c.

Using the results of the consistent hash lookup, border router 120c forces the routing of return flow 170 to go to border router 120a of cluster 110a. Border router 120a uses the return flow's five-tuple as a key to perform a consistent hash lookup according to the consistent hash table generated by border router 120a. Using the results of the consistent hash lookup, border router 120a forces the routing of return flow 170 to go to edge router 130a. Edge router 130a will then route return flow 170 to the destination device, which would be branch node 180a in the illustrated embodiment.

The consistent hash technique as described in the exemplary embodiment is a hashing technique that allows for when a hash table is resized (like when a border router 120 gets added to cluster 110), only n/m keys on average need to be remapped where n is the number of keys and m is the number of border routers 120 in a cluster 110. Traditionally, a change in the size of the hash table would cause many keys to be remapped because the hashing function is a modular operation. Consistent hashing solves this problem because in a consistent hash algorithm when border router 120 in cluster 110 gets removed, the vast majority of keys maintain their prior border router 120 assignments and the addition of a nth border router causes 1/n fraction of the keys to map to a different border router 120 from previous mappings. In some embodiments, let hashKey(x) and hashBR(x) be the hash functions used for the key of initial flow 160 or return flow 170 and border router 120. The hash functions may be any suitable hashing algorithms capable of providing a hash value. The hash functions may include Message Digest 5 (MD5), Secure Hashing Algorithm (SHA) 1 and 2, or the like. A binary search tree may be used to maintain the IDs of border routers 120 in a cluster or hashring (where IDs equal hashBR(x) %360 and x=the border router 120 identifiers such as its IP address) and to find the successor or minimum within the binary search tree. In some embodiments, when a new key x for either an initial flow 160 or return flow 170 needs to be hashed according to the consistent hash table, let B equal hashKey(x) % 360. To assign key x to a particular border router, find the successor B in the binary search tree of the IDs of the border routers 120. If B is larger than the border router IDs in the binary search tree, the key is assigned to the border router with the smallest ID value in the binary search tree. In some embodiments, to insert an additional border router Y into cluster 110, let P equal hashBR(Y) %360. Then the flows whose hash value of their keys are smaller than P are moved from border router 120 whose ID is a successor of P. If P is the largest of the IDs, then the flows whose hash value of their keys are smaller than P are moved from the border router who has the smallest ID into P. In some embodiments, when a border router is to be deleted from cluster 110, then the consistent hash will find the successor of P in the binary search tree and move the flows from the successor. If P does not have a successor in the binary search tree, then the flows are moved to the smallest border router represented in the binary search tree. This consistent hash process serves as an example of how a consistent hash function would work according to some embodiments of the present disclosure. A consistent hash according to the present disclosure could be any suitable consistent hash that is capable of being a distributing hashing scheme that operates independently of the number of border routers in a cluster by assigning them a position on an abstract circle or hash ring. While consistent hashing is the preferred embodiment of the present disclosure, some embodiments encompass using any variation of hashing, including more traditional hashing techniques.

Modifications, additions, or omissions may be made to network 100 without departing from the scope of the disclosure. For example, the key to the consistent hash table lookup does not have to be the initial and return flow's five-tuple. Instead, the key can be any suitable data type or tuple that may identify the specific traffic pattern of the packet. For example, the key representing initial flow 160 and return flow 170 may be a two-tuple where the two-tuple includes the destination Media Access Control (MAC) Address and the source MAC address. Alternatively, the key representing initial flow 160 and return flow 170 may be a four-tuple that includes the source IP address, destination IP address, Virtual LAN (VLAN) tag 1, and VLAN tag 2. Another modification that may be made to network 100 is that controllers 150a-c may be combined into one single device. In some embodiments, network 100 may not include controller 150, and border routers 120, cluster 110, edge routers 130, or any suitable device in network 100 is capable of communicating cluster state 140 to edge routers 130 and border routers 120 in network 100. As another example, network 100 may contain any number of edge routers 130, border routers 120, and branch nodes 180. Another example is that the consistent hash table does not need to be generated by edge router 130 or border router 120; instead, the consistent hash table may be generated by controller 150 and controller 150 may communicate the consistent hash table to edge router 130 or border router 120. In some embodiments, edge router 130 and border router 120 may not receive the consistent hash table and receives a routing instruction from controller 150 because controller 150 has generated the consistent hash table and sends routing instructions based on using initial flow 160 or return flow 170 as a key to the consistent hash table.

Figure 2:
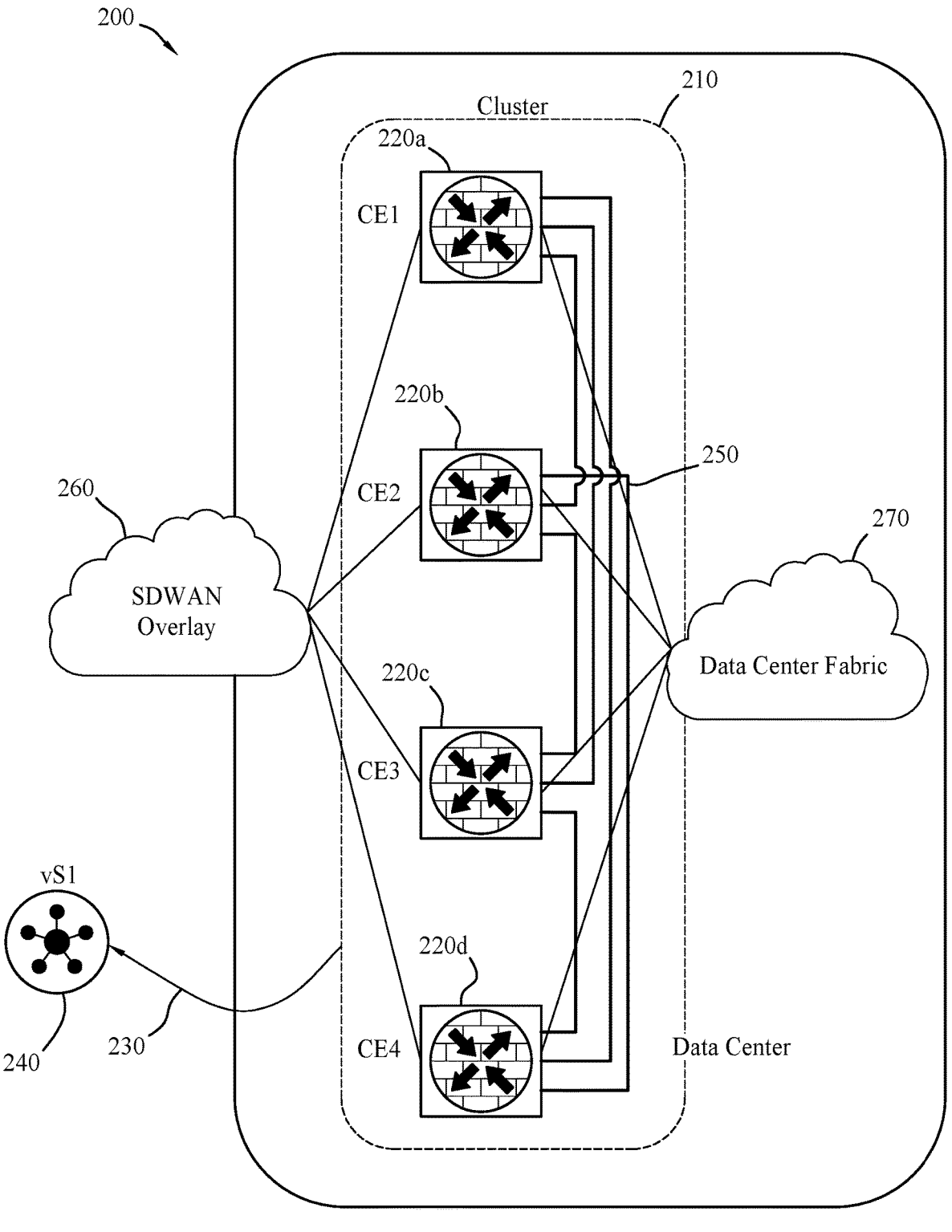
FIG. 2 illustrates a cluster in greater detail, according to one embodiment of the present disclosure.

FIG. 2 illustrates a cluster in greater detail, according to one embodiment of the present disclosure. In the illustrated embodiment, computer network 200 comprises a cluster 210 which interconnects a SD-WAN Overlay network 260 and a Data Center Fabric Network 270. Cluster 210 comprises a plurality of border routers 220. Each border router 220 in cluster 210 is communicatively coupled to each other through one or more tunnels 250. Computer network 200 also comprises a controller 240. Cluster 210 may communicate a cluster state 230 to controller 240.

Border routers 220 represent any suitable network device that facilitates communication between endpoints in a first network and endpoints in a second network. Border routers 220 may include border routers and edge routers. Border routers may be interconnected to endpoints in each network by the public Internet, a MPLS VPN, SD-WAN, or the like. In some embodiments, border routers represent any suitable network device that facilitates communication between end points in a first region of a network and a second region of a network. In some embodiments, border routers represent any suitable network device that facilitates communication between endpoints in a first network and a core network. In those embodiments, a core network may include an OMP core network such as an SD-WAN overlay.

Cluster 210 represents any grouping of two or more border routers 220. Cluster 210 may include colo sites, regional POP sites, data centers, ISP POP sites, internet exchange points, or the like. In some embodiments, cluster 210 is operated by an ISP. In other embodiments, cluster 210 is operated by a single organization within a single network. In certain embodiments, cluster 210 is located in between two different networks. In other embodiments, cluster 210 is located in between different regions of the same network. In some embodiments, cluster 210 comprises a plurality of border routers 220 in one device such as, for example, a server. In other embodiments, cluster 210 comprises a plurality of border routers 220 in separate devices, but in the same location.

Cluster state 230 represents any suitable data type that indicates information regarding the cluster 210. Cluster state 230 may include integer values, string words, or any other data type that is capable of conveying information regarding a cluster 210. For example, in a four node all-active cluster as illustrated in FIG. 2, cluster state 230 may comprise data such as "CE1 is active", "CE2 is active", "CE3 is active", and "CE4 is active" where "CE1", "CE2", "CE3", and "CE4" represent each of the border routers 220 in cluster 210. In some embodiments, cluster state 230 may comprise data or information that indicates that the cluster state has changed. A cluster state 230 may change when a border router 220 in cluster 210 is added or deleted from the cluster. For example, if border router 220 is removed from cluster 210, cluster state 230 may comprise data such as "CE4 is removed from cluster." In some embodiments, cluster state 230 may comprise data or information merely indicating the number of active border routers 220 in cluster 210. For example, cluster state 230 may comprise data such as "4."

Controller 240 represents any suitable network device that facilitates building and maintaining a network topology and make decisions on where traffic flows in network 200. Controller 240 may comprise one or more physical or virtual network controller appliances. Controller 240 may include devices such as a physical or virtual Cisco® SD-WAN vSmart controller. In some embodiments, controller 240 may establish secure connections to each device in network 200 and distribute route and policy information via a control plane protocol. The control plane protocol may include OMP, OSPF, IS-IS, Border Gateway Protocol, PIM, IGMP, ICMP, ARP, BFD, LACP, etc. In certain embodiments, controller 240 is capable of communicating cluster state 230 of cluster 210 in network 200 to any device in network 200. In some embodiments, controller 240 communicates cluster state 230 to border routers 220 in clusters 210. In some embodiments, controller 240 may operate as route reflectors. Controller 240 may also orchestrate secure connectivity between and among the devices in the network. For example, in some embodiments, controller 240 may distribute crypto key information among the network device(s). This allows network 200 to support a secure network protocol or application (e.g., IPSec, TLS, SSH, etc.) without IKE and enable scalability of the network.

Tunnels 250 represent any suitable point-to-point tunnel that communicatively couples each border router 220 in cluster 210 to each other. Tunnels 250 may include Generic Routing Encapsulation (GRE) tunnels, full-mesh GRE tunnels, IP Tunnels, UDP tunnels, IPSec Tunnels, Layer 2 Tunneling Protocol (L2TP), Point to Point Tunneling Protocol, Layer 2 Forwarding (L2F), and the like. Tunnels 250 may be formed over direct communication links to each border router 220 or may be formed over communication links that span different networks.

SD-WAN Overlay Network 260 represents any suitable software-defined network topology that is capable of interconnecting with cluster 210. SD-WAN Overlay Network 260 (sometimes also referred to as a network fabric or fabric) is a virtual network topology, built on top of an underlying physical network (i.e., the underlay network). SD-WAN Overlay Network 260 may create a logical topology used to virtually connect devices built on top of an arbitrary physical network topology. SD-WAN Overlay Network 260 may include GRE or Multipoint GRE (mGRE), MPLS VPN or VPLS, IPsec or Dynamic Multipoint Virtual Private Network (DMVPN), CAPWAP (Control and Provisioning of Wireless Access Points), VXLAN, Location/Identifier Separation Protocol (LISP), Cisco® Overlay Transport Virtualization (OTV), and Cisco® Application Centric Infrastructure (Cisco ACI™) among others.

Data Center Fabric Network 270 represents any suitable network topology for implementing a data center and is capable of interconnecting with cluster 210. Data Center Fabric Network 270 may include a software defined networking (SDN) data center fabric, traditional Local Area Network, Spine and Leaf Architecture, or the like. For example, Data Center Fabric Network 270 may be the Cisco® Application Centric Infrastructure (Cisco ACI™). In some embodiments, Data Center Fabric Network 270 may comprise a SD-WAN Overlay Network. In some embodiments, Data Center Fabric Network 270 is a part of the SD-WAN Overlay Network 260.

In an exemplary embodiment of operation, a user configures cluster 210 and border routers 220 within cluster 210. In some embodiments, border routers 220 in cluster 210 may learn peer border routers 220 automatically via controller 240 using an OMP, instead of a static configuration. Then cluster 210 may build point-to-point tunnels 250 to each peer border router 220 that is learned dynamically or statically configured. Cluster 210 may also run a BFD protocol to detect the liveliness of each peer border router 220 and to exchange a digest of each border router 220 in cluster 210. In some embodiments, the digest is called a "cluster node list." Once the BFD algorithm has been run and cluster 210 and each border router 220 has determined that there is a stable state of border routers 220 in cluster 210, cluster 210 will be in a stable state. Then cluster 210 may create cluster state 230, which will include the list of border routers 220 of cluster 210. Cluster 210 may then communicate to controller 240 cluster state 230 via the OMP, which will in turn reflect cluster state 230 to edge routers and branch sites in the SD-WAN Overlay Network 260. In some embodiments, where cluster 210 is interconnected to a MRF, cluster 210 will advertise cluster state 230 to an access region and to a core region. In some embodiments, there will be a new address family defined in the OMP to advertise cluster state 230. When there are dynamic changes that take place to cluster 210, such as border router 220 going down for service or a new border router 220 being added to the cluster 210, the BFD will quickly detect the change, make a determination that a change did in fact occur, and will update cluster state 230 and communicate it to controller 240 to be communicated to the branch sites. In some embodiments, the BFD algorithm for detecting cluster state 230 of cluster 210 is configured to be at least 2 to 3 times less than the typical update period for the SD-WAN Overlay Network 260. One advantage of doing so is that the changes in cluster state 230 of cluster 210 are detected faster and are advertised to the remote sites before routing converges. Another advantage in some embodiments is that there will not be black-holing traffic or race conditions where border routers 220 fail or are added to cluster 210 because the branch sites will see cluster state 230 before the routing converges.

Modifications, additions, or omissions may be made to network 200 without departing from the scope of the disclosure. For example, any number of border routers 220 may be included in cluster 210. As another example, cluster 210 may be interconnected to non-SDN network topologies such as WAN, LAN, public Internet, MPLS, and the like. Another example is that Data Center Fabric Network 270 may comprise one server. Another example is that cluster 210 may communicate cluster state 230 to branch nodes directly and not via controller 240. Another example is that controller 240 may advertise the cluster state 230 to the data center fabric network 270. Another modification may be that the cluster 210 may not use BFD to detect the cluster state 230 of cluster 210 and may use any suitable networking protocol that is capable of detecting failures, removals, or additions in a cluster 210.

Figure 3:
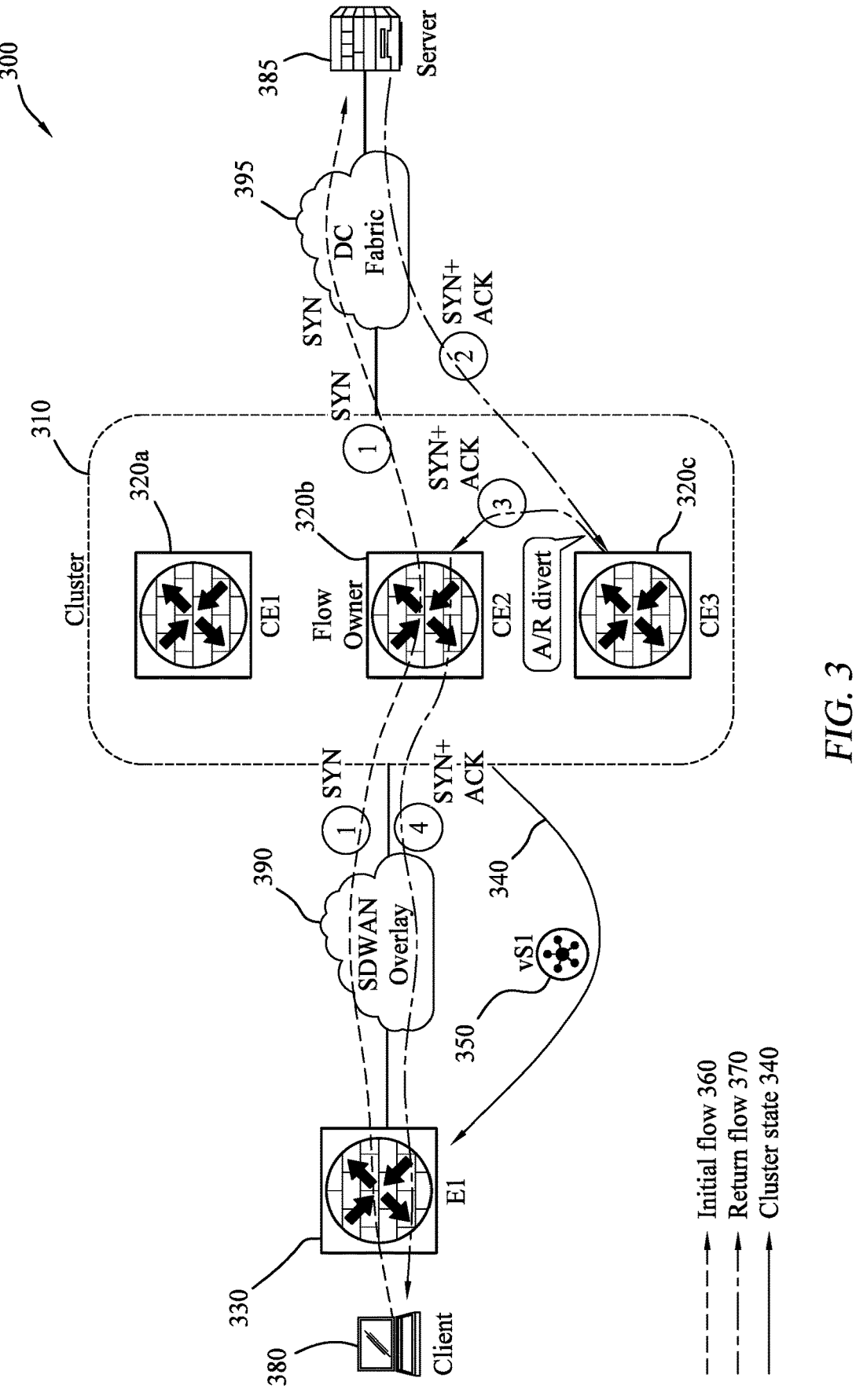
FIG. 3 illustrates an example computer network that provides stateless symmetric forwarding of packets through a cluster that is connected to two different types of computer networks, according to some embodiments of the present disclosure.

FIG. 3 illustrates an example computer network that provides stateless symmetric forwarding of packets through a cluster that is connected to two different types of computer networks, according to some embodiments of the present disclosure. In the illustrated embodiment, network 300 comprises two different networks: a SD-WAN Overlay Network 390 and a Data Center Fabric 395. Each network is interconnected by a cluster 310. Each cluster 310 comprises a plurality of border routers 320. A SD-WAN overlay interconnects an edge router 330 with cluster 310. In the illustrated embodiment, branch node 380 is connected to one edge router 330. According to the illustrated embodiment, cluster states 340 of cluster 310 are communicated via one or more controllers 350 to the edge node 330. In the illustrated embodiment, an initial flow 360 of traffic is routed from a first branch node 380 through edge router 330. Then the initial flow 360 of traffic is routed from the edge router 330 through a first border router 320*b* and then through the Data Center Fabric 395 to a server 385. Upon receiving the initial flow 360 of traffic, the server 385 routes a return flow 370 from the server 385 through Data Center Fabric 395. Then the return flow 370 of traffic is routed from Data Center Fabric 395 to a second border router 320*c*. Upon receiving return flow 370, the second border router 320*c* diverts the return flow 370 to the first border router 320*b* according to a consistent hash table lookup. Then return flow 370 proceeds through the first border router 320*b* and then through the edge router 330 to the branch node 380.

Border routers 320 represent any suitable network device that facilitates communication between endpoints in a first network and endpoints in a second network. Border routers 320 may include border routers and edge routers. Border routers 320 may be interconnected to endpoints in each network by the public Internet, MPLS VPN, SD-WAN, or the like. In some embodiments, border routers 320 represent any suitable network device that facilitates communication between end points in a first region of a network and a second region of a network. In some embodiments, border routers 320 represent any suitable network device that facilitates communication between endpoints in a first network and a core network. In those embodiments, a core network may include an OMP core network.

Cluster 310 represents any grouping of two or more border routers 320. Cluster 310 may include colo sites, regional POP sites, data centers, ISP POP sites, internet exchange points, or the like. In some embodiments, cluster 310 is operated by an ISP. In other embodiments, cluster 310 is operated by a single organization within a single network. In certain embodiments, cluster 310 is located between two different networks. In some embodiments, cluster 310 comprises a plurality of border routers 320 in one device such as, for example, a server. In other embodiments, cluster 310 comprises a plurality of border routers 320 in separate devices but in the same location.

Edge router 330 represents any suitable network device that facilitates communication between one or more branch nodes 380 and one or more endpoints in a computer network. Edge router 330 may include edge routers, access routers, branch routers, or the like. Edge router 330 may be interconnected to endpoints in a network by the public internet, a MPLS VPN, SD-WAN, SD-WAN overlay, WAN, LAN, or the like. Edge router 330 may communicate to branch node 380 through either wired or wireless connections. Edge router 330 may communicate via TCP, UDP, or any suitable other networking protocol.

Branch nodes 380 represent any suitable device that is capable of connecting to network 300. Branch node 380 may include other routers, servers, end-user devices such as laptops, phones, tablets, and any other suitable device capable of connecting to a network. Branch node 380 may comprise one or more network interfaces, at least one processor, and a memory that is interconnected by a system bus as well as a power supply. In some embodiments, branch nodes 380 represent devices that are capable of running an application or groups of applications on computer network 300. Branch node 380 may include general purpose computing devices (e.g., servers, workstations, desktop computers, etc.), mobile computing devices (e.g., laptops, tablets, mobile phones, etc.), wearable devices (e.g., watches, glasses or other HMDs, ear devices, etc.), and so forth. Branch nodes 380 may also include IoT devices or equipment, such as agricultural equipment (e.g., livestock tracking and management systems, watering devices, UAVs, etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, POS devices, RFID tags, etc.); smart city devices (e.g., street lamps, parking meters, waste management sensors, etc.); transportation and logistical equipment (e.g., turnstiles, rental car trackers, navigational devices, inventory monitors, etc.); and so forth.

Server 385 represents any suitable device that is capable of serving and/or receiving content using any internetworking protocol to any number of devices on computer network 300. Server 385 may include web servers, database servers, email servers, web proxy servers, Domain Name System (DNS) servers, File Transfer Protocol (FTP) servers, file servers, virtual servers, application servers, and Dynamic Host Configuration Protocol (DHCP) servers. In some embodiments, server 385 may represent the cloud-based resources of network 300. Servers 385 may comprise one or more network interfaces, at least one processor, and memory that is interconnected by a system bus as well as a power supply. Server 385 may include, in various embodiments, any number of suitable servers or other cloud-based resources.

Cluster state 340 represents any suitable data type that indicates information regarding the cluster 310. Cluster state 340 may include integer values, string words, or any other data type that is capable of conveying information regarding a cluster 310. For example, in a three node all-active cluster as illustrated in FIG. 3, cluster state 340 may include data such as "CE1 is active", "CE2 is active", and "CE3 is active" where "CE1", "CE2", and "CE3" represent each of the border routers 320 in cluster 310. In some embodiments, cluster state 340 may include data or information that indicates that the cluster state 340 has changed. A cluster state may change when a border router 320 in cluster 310 is added or deleted from the cluster. For example, if a border router 320 is removed from a cluster 310, cluster state 340 may comprise data such as "CE1 is removed from cluster." In some embodiments, cluster state 340 may include data or information merely indicating the number of active border routers 320 in a cluster 310. For example, cluster state 340 may include data such as "3."

Controller 350 represents any suitable network device that facilitates building and maintaining a network topology and making decisions on where traffic flows in network 300. Controller 350 may include one or more physical or virtual network controller appliances. The controller 350 may include devices such as a physical or virtual Cisco® SD-WAN vSmart controller. In some embodiments, controller 350 may establish secure connections to each device in network 300 and distribute route and policy information via a control plane protocol. The control plane protocol may include OMP, OSPF, IS-IS, Border Gateway Protocol, PIM, IGMP, ICMP, ARP, BFD, LACP, etc.). In certain embodiments, controller 350 is capable of communicating cluster state 340 of cluster 310 in network 300 to any device in network 300. In some embodiments, controller 350 only communicates cluster state 340 to edge routers 330 and to border routers 320 in clusters 310. In some embodiments, controller 350 may operate as route reflectors. The controller 350 may also orchestrate secure connectivity between and among the devices in the network. For example, in some embodiments, the controller 350 may distribute crypto key information among the network device(s). This allows the network to support a secure network protocol or application (e.g., IPSec, TLS, SSH, etc.) without IKE and enable scalability of the network.

Initial flow 360 represents any suitable flow of data packets, traffic, or messages that may be exchanged among the devices of computer network 300 from a first branch node 380 to a second branch node such as server 385. Initial flow 360 may be exchanged over links using predefined network communication protocols such as TCP/IP, UDP, ATM protocol, Frame Relay protocol, or any other suitable protocol. In the illustrated embodiment, initial flow 360 is exchanged over a link of devices in network 300 using a TCP protocol performing the first step of a TCP three-way handshake. In particular, in the illustrated embodiment, initial flow 360 is using a TCP syn message type which is used to initiate and establish a connection between the first branch node 380 and the server 385.

Return flow 370 represents any suitable flow of data packets, traffic, or messages that may be exchanged among the devices of computer network 300 from a branch node, such as server 385, to first branch node 380 in response to receiving the initial flow 360. Return flow 370 may be exchanged over links using predefined network communication protocols such as TCP/IP, UDP, ATM protocol, Frame Relay protocol, or any other suitable protocol. In the illustrated embodiment, return flow 370 is exchanged over a link of devices in network 300 using a TCP protocol performing the second step of a TCP three-way handshake. In the illustrated embodiment, return flow 370 is using a TCP syn-ack message type, which is used to initiate and establish a connection between server 385 and first branch node 380.

SD-WAN Overlay network 390 represents any suitable software-defined network topology that is capable of inter-connecting with cluster 310. SD-WAN Overlay Network (sometimes also referred to as a network fabric or fabric) is a virtual network topology, built on top of an underlying physical network (i.e., the underlay network). SD-WAN Overlay Network may create a logical topology used to virtually connect devices built on top of an arbitrary physical network topology. SD-WAN Overlay Network 390 may include GRE or mGRE, MPLS VPN or VPLS, IPsec or DMVPN, CAPWAP, VXLAN, LISP, Cisco® OTV, and Cisco® ACI™, among others.

Data Center Fabric 395 represents any suitable network topology for implementing a data center and is capable of interconnecting with cluster 310. Data Center Fabric 395 may include a SDN data center fabric, traditional Local Area Network, Spine and Leaf Architecture, or the like. For example, Data Center Fabric 395 may be the Cisco® ACI™. In some embodiments, Data Center Fabric 395 may comprise a SD-WAN Overlay network. In some embodiments, Data Center Fabric 395 may be a part of the SD-WAN Overlay Network 390.

In an exemplary embodiment of operation, controller 350 determines the cluster state 340 of the border routers 320*a*, 320*b*, and 320*c* in cluster 310. For example, in the illustrated embodiment, the cluster state 340 in cluster 310 is three active border routers 320*a*, 320*b*, and 320*c*. Controller 350 communicates cluster state 340 to edge router 330. Similarly, controller 350 also communicates cluster state 340 to border routers 320*a-c*. Then edge router 330 and border routers 320*a-c* will then generate a consistent hash table based on the cluster state 340 that was communicated to them by controller 350. The process to generate a consistent hash table based on the cluster state 340 is discussed in more detail with regards to the embodiment in FIG. 1 above. According to some embodiments, each consistent hash table, when given an incoming packet as input, will route the packet to a specific owner border router 320 in a cluster 310 based on the consistent hash.

In the exemplary embodiment of operation, an initial flow 360 begins when the edge router 330 receives a packet from a branch node 380. The edge router 330 uses the initial flow's five-tuple as a key to perform a consistent hash lookup according to the consistent hash table generated by edge router 330. A five-tuple refers to a set of five different values that comprise a TCP/IP connection, including a source IP address, source port number, destination IP address, destination port number, and the protocol in use. Using the results of the consistent hash lookup, the edge router 330 forces the routing of the initial flow 360 to go to border router 320*b* of cluster 310. Border router 320*b* will then route initial flow 160 to its destination device through Data Center Fabric 395, which is server 385 in the illustrated embodiment.

Still according to the exemplary embodiment of operation, a return flow 370 begins when server 385 sends a TCP syn-ack response message through Data Center Fabric 395. However, because server 385 is a part of a different network than the SD-WAN Overlay Network 390, server 385 does not know the consistent hash table or the cluster state 340 of cluster 310. Therefore, server 385 may route return flow 370 to any one of the border routers 320*a-c* in cluster 310. But because each border router 320*a-c* knows the cluster state 340, the consistent hash table, and that the return flow 370 is coming from a different network, at the beginning of processing the packet response from the server 385, each border router is able to perform a consistent hash lookup and either route return flow 370 through itself if it is the correct flow owner border router or it is able to divert the return flow 370 the correct flow owner border router in cluster 310. In the illustrated embodiment, the border router 320*c* receives TCP syn-ack response message from server 385. The border router 320*c* uses the return flow's five-tuple as a key to perform a consistent hash lookup according to the consistent hash table generated by border router 320*c*. Using the results of the consistent hash lookup, the border router 320*c* diverts the routing of the return flow 370 to go to border router 320*b* of cluster 310. Importantly, using the consistent hash lookup will result in the return flow 370 being symmetrically routed through the same border router 320 that the initial flow 360 went through. Similarly, border router 320*b* uses the return flow's five-tuple as a key to perform a consistent hash lookup according to the consistent hash table generated by border router 320*b*. Using the results of the consistent hash lookup, the border router 320*b* verifies that it is the owner node and then routes return flow 370 to its destination device through SD-WAN Overlay Network 390, which is branch node 380 in the illustrated embodiment.

Modifications, additions, or omissions may be made to network 300 without departing from the scope of the disclosure. For example, any number of border routers 320 may be included in cluster 310. As another example, any number of edge routers 330 and branch nodes 380 may be included in network 300. In some embodiments, the symmetrical forwarding with just local hashing as it is done according to the illustrated embodiment in FIG. 3 for traffic coming from a non-SD-WAN data center network case can be achieved in SD-WAN only environments. However, using this could result in diverting in both directions of the flow, which would be less efficient than with network wide hashing.

Figure 4:
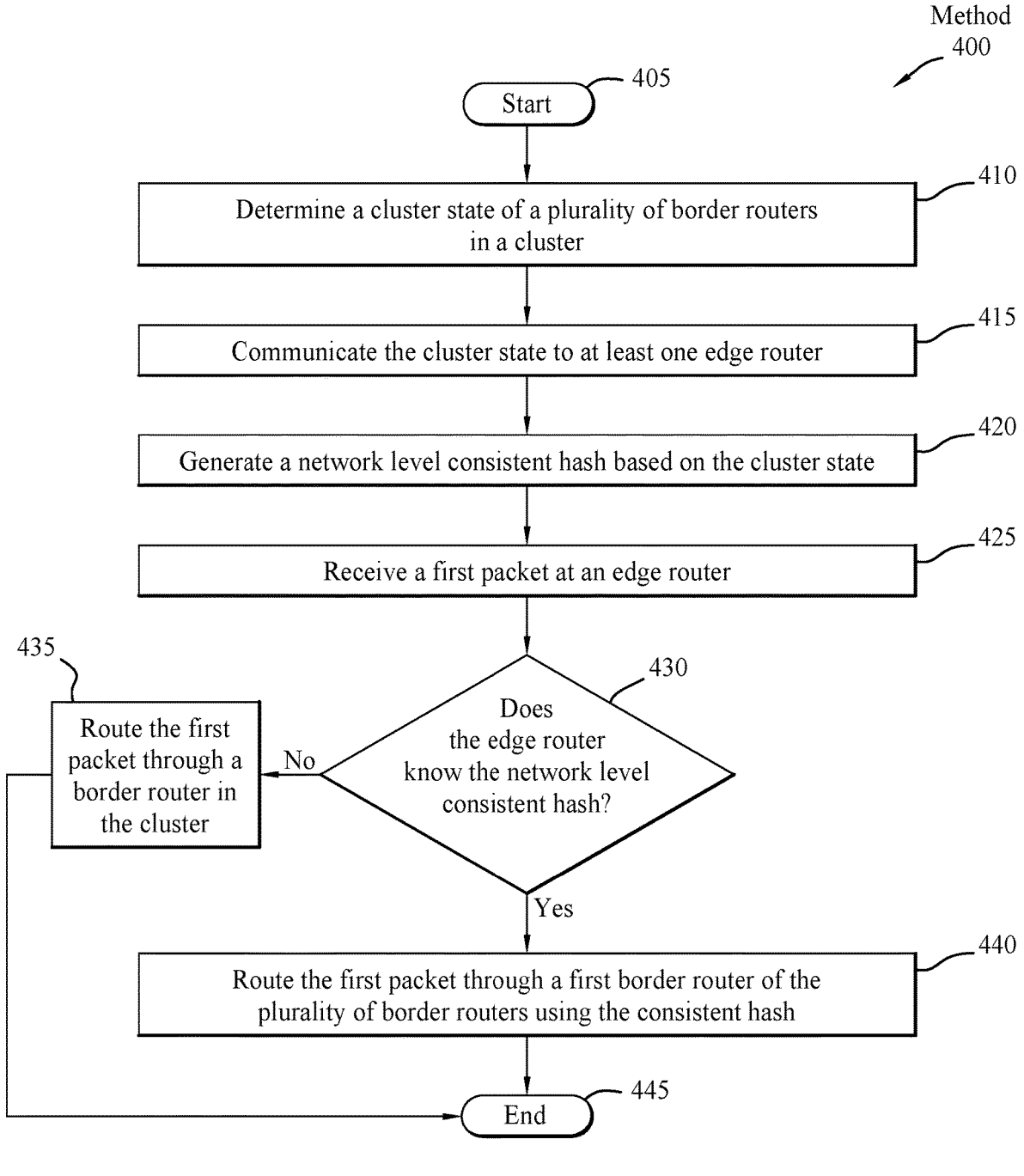
FIG. 4 illustrates an example method for stateless symmetric forwarding of packets through clusters, according to some embodiments of the present disclosure.

FIG. 4 illustrates an example method for stateless symmetric forwarding of packets through clusters, according to some embodiments of the present disclosure.

At step 405, method 400 begins. At step 410, controller 150 determines a cluster state 140 of border routers 120 in cluster 110. In some embodiments, controller 150 may build point-to-point tunnels between each border router 120 in cluster 110. In some embodiments, to determine cluster state 140 of border routers 120 in cluster 110, controller 150 will run a BFD algorithm to detect the liveliness of all border routers 120 in cluster 110. In some embodiments, controller 150 may transform the data that is determined by running the BFD algorithm into a communicable format such as a string or integer. In some embodiments, controller 150 may also communicate certain identifying information about each border router 120 in cluster 110 such as its IP address or its Universally Unique Identifier (UUID).

At step 415, the cluster state 140 is communicated to at least one edge router 130 in network 100. In some embodiments, the controller 150 is able to communicate the cluster state 140 of cluster 110 via the OMP. In some embodiments, controller 150 communicates the cluster state 140 of cluster 110 via a tunnel such as an IPSec tunnel. In other embodiments, the controller 150 does not communicate the cluster state 140 at all and is instead communicated directly from cluster 110 to the edge routers 130 via a TCP/IP link or through the SD-WAN Overlay Network. In some embodiments, cluster state 140 is communicated to one or more branch nodes 180 in network 100.

At step 420, one or more devices or nodes in network 100 generate a network level consistent hash based on cluster state 140 of cluster 110. In some embodiments, a consistent hash table is generated where the five-tuples of initial flow 160 and return flow 170 are the keys to the hash table and each index in the consistent hash table is an active border router 120 in cluster 110 based on the cluster state 140. In some embodiments, each edge router 130 generates its own network level consistent hash based on cluster state 140. In some embodiments, controller 150 generates the network level consistent hash and then communicates the network level consistent hash table to each edge router 130. In some embodiments, one or more border routers 120 generate the network level consistent hash. In some embodiments, one or more devices or nodes in network 100 update the network level consistent hash based on a determination that the cluster state 140 of cluster 110 has changed.

At step 425, edge router 130*a* receives a packet from a branch node 180*a*. The packet is a part of initial flow 160.

At step 430, edge router 130*a* determines whether it knows the network level consistent hash. If edge router 130*a* does know the network level consistent hash, then method 400 proceeds to step 440. If edge router 130*a* does not know the network level consistent hash, then method 400 proceeds to step 435.

At step 435, edge router 130*a* routes initial flow 160 to cluster 110. However, since edge router 130*a* does not know the network level consistent hash, edge router 130*a* may route initial flow 160 to the incorrect border router 120 in cluster 110.

At step 440, the edge router 130*a* uses initial flow's five-tuple as a key to perform a consistent hash lookup according to the consistent hash table generated by edge router 130*a*. Using the results of the consistent hash lookup, edge router 130*a* forces the routing of the initial flow 160 to go to border router 120*a* of cluster 110*a*. Similarly, border router 120*a* uses the initial flow's five-tuple as a key to perform a consistent hash lookup according to the consistent hash table generated by border router 120*a*. Using the results of the consistent hash lookup, border router 120*a* forces the routing of initial flow 160 to go to border router 120*c* of cluster 110*b*. Border router 120*c* uses the initial flow's five-tuple as a key to perform a consistent hash lookup according to the consistent hash table generated by border router 120*c*. A five-tuple refers to a set of five different values that comprise a TCP/IP connection, including a source IP address, source port number, destination IP address, destination port number, and the protocol in use. Using the results of the consistent hash lookup, border router 120*c* may then force the routing of initial flow 160 to go to edge router 130*d*. Edge router 130*d* may then route initial flow 160 to its destination device, which would be branch node 180*b*.

At step 445, method 400 may end. In some embodiments, method 445 may then proceed to additional steps according to the present disclosure.

Various embodiments may perform some, all, or none of the steps described above. For example, certain embodiments may omit steps 420 under certain conditions. Furthermore, certain embodiments may perform these steps in a different order or in parallel. Moreover, one or more steps may be repeated. For example, steps 425-440 may be repeated for any number of initial flows 160. While discussed as edge router 130, controller 150, and border router 120 as performing the steps of this method, any suitable component of computer network 100 may perform one or more steps of the method.

FIG. 5 illustrates an example method for stateless symmetric forwarding of packets through a cluster connected to two different types of computer networks, according to some embodiments of the present disclosure.

At step 505, method 500 begins. At step 510, controller 350 determines a cluster state 340 of the border routers 320 in cluster 310. In some embodiments, controller 350 may build point-to-point tunnels 250 between each border router 320 in cluster 310. In some embodiments, to determine a cluster state 340 of border routers 320 in cluster 310 controller 350 will run a BFD algorithm to detect the liveliness of all border routers 320 in cluster 310. In some embodiments, controller 350 may transform the data that is determined by running the BFD algorithm into a communicable format such as a string or integer. In some embodiments, controller 350 may also communicate certain identifying information about each border router 320 in cluster 310 such as its IP address or its UUID.

At step 515, cluster state 340 is communicated to at least one edge router 330 in network 300. In some embodiments, controller 350 is able to communicate cluster state 340 of cluster 310 via the OMP. In some embodiments, controller 350 communicates cluster state 340 of cluster 310 via a tunnel such as an IPSec tunnel. In other embodiments, controller 350 does not communicate cluster state 340 at all and is instead communicated directly from cluster 310 to edge routers 330 via a TCP/IP link or through the SDWAN Overlay Network. In some embodiments, cluster state 340 is communicated to one or more branch nodes 380 in network 300.

At step 520, one or more devices or nodes in network 300 generates a network level consistent hash based on the cluster state 340 of cluster 310. In some embodiments, a consistent hash table is generated where the five-tuples of initial flow 360 and return flow 370 are the keys to the hash table and each index in the consistent hash table is an active border router 320 in cluster 310 based on cluster state 340. In some embodiments, each edge router 330 generates its own network level consistent hash based on cluster state 340. In some embodiments, controller 350 generates the network level consistent hash and then communicates the network level consistent hash table to each edge router 330. In some embodiments, one or more border routers 320 generate the network level consistent hash.

At step 525, edge router 330 receives a packet from a branch node 380. The packet is a part of initial flow 360.

At step 530, the edge router 330 uses the initial flow's five-tuple as a key to perform a consistent hash lookup according to the consistent hash table generated by edge router 330. A five-tuple refers to a set of five different values that comprise a TCP/IP connection, including a source IP address, source port number, destination IP address, destination port number, and the protocol in use. Using the results of the consistent hash lookup, edge router 330 forces the routing of initial flow 360 to go to border router 320_b_ of cluster 310. Border router 320_b_ will then route initial flow 160 to its destination device through Data Center Fabric 395, which would be server 385.

At step 535, border router 320_c_ receives TCP syn-ack response message packet of return flow 370 from server 385.

At step 540, border router 320_c_ determines whether the packet from return flow 370 is supposed to be routed through border router 320_c_ according to the network level consistent hash. The border router 320_c_ uses the return flow's five-tuple as a key to perform a consistent hash lookup according to the consistent hash table generated by border router 320_c_. Using the results of the consistent hash lookup, if 320_c_ is the correct border router for return flow 370, then method 500 proceeds to step 545. Using the results of the consistent hash lookup, if 320_c_ is not the correct border router for return flow 370, then method 500 proceeds to step 550.

At step 545, border router 320_c_ uses the return flow's five-tuple as a key to perform a consistent hash lookup according to the consistent hash table generated by border router 320_b_. Using the results of the consistent hash lookup, border router 320_c_ verifies that it is the owner node and then routes return flow 370 to its destination device through SD-WAN Overlay Network 390, which would be branch node 380.

At step 550, border router 320_c_ diverts the routing of return flow 370 to go to border router 320_b_ of cluster 310.

Importantly, using the consistent hash lookup will result in the return flow 370 being symmetrically routed through the same border router 320 that the initial flow 360 went through.

At step 555, border router 320_b_ uses the return flow's five-tuple as a key to perform a consistent hash lookup according to the consistent hash table generated by border router 320_b_. Using the results of the consistent hash lookup, border router 320_b_ verifies that it is the owner node and then routes return flow 370 to its destination device through SD-WAN Overlay Network 390, which would be branch node 380

At step 560, method 500 may end. In some embodiments, method 500 may then proceed to additional steps according to the present disclosure.

Various embodiments may perform some, all, or none of the steps described above. For example, certain embodiments may omit step 520 under certain conditions. Furthermore, certain embodiments may perform these steps in a different order or in parallel. Moreover, one or more steps may be repeated. For example, steps 525-560 may be repeated for any number of initial flows 360. While discussed as edge router 330, controller 350, and border router 320 performing the steps of this method, any suitable component of computer network 300 may perform one or more steps of the method.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:

one or more processors; and one or more computer-readable non-transitory storage media comprising instructions that, when executed by the one or more processors, cause one or more components of the system to perform operations comprising:

determining a first cluster state of a first plurality of border routers in a first cluster, wherein the first cluster is located between a core network and a first regional network;

determining a second cluster state of a second plurality of border routers in a second cluster, wherein the second cluster is located between the core network and a second regional network;

generating a network level consistent hash based on the first cluster state and the second cluster state;

receiving, by a first border router of the first plurality of border routers in the first cluster, a packet from a node in the first regional network;

selecting, from the first plurality of border routers and the second plurality of border routers, an owner border router using the network level consistent hash; and routing the packet to the owner border router.

2. The system of claim 1, wherein determining the first cluster state of the first plurality of border routers in the first cluster comprises implementing a bidirectional forwarding detection protocol.

3. The system of claim 1, wherein determining the second cluster state comprises receiving the second cluster state from a controller.

4. The system of claim 1, the operations further comprising:

diverting the packet received by the first border router by routing the packet from the owner border router in the first cluster using the network level consistent hash.

5. The system of claim 1, wherein generating the network level consistent hash based on the first cluster state and the second cluster state comprises generating a consistent hash table wherein a key to the consistent hash table comprises a five-tuple of the packet.

6. The system of claim 1, the operations further comprising:

updating the network level consistent hash based on a determination that the first cluster state of the first cluster has changed; and updating the network level consistent hash based on a determination that the second cluster state of the second cluster has changed.

7. The system of claim 1, wherein:

the first cluster state is communicated to nodes within the first regional network by a first controller but not to nodes exclusively within the second regional network; and the second cluster state is communicated to nodes within the second regional network by a second controller but not to nodes exclusively within the first regional network.

8. A method, comprising:

determining a first cluster state of a first plurality of border routers in a first cluster, wherein the first cluster is located between a core network and a first regional network;

determining a second cluster state of a second plurality of border routers in a second cluster, wherein the second cluster is located between the core network and a second regional network;

generating a network level consistent hash based on the first cluster state and the second cluster state;

receiving, by a first border router of the first plurality of border routers in the first cluster, a packet from a node in the first regional network;

selecting, from the first plurality of border routers and the second plurality of border routers, an owner border router using the network level consistent hash; and routing the packet to the owner border router.

9. The method of claim 8, wherein determining the first cluster state of the first plurality of border routers in the first cluster comprises implementing a bidirectional forwarding detection protocol.

10. The method of claim 8, wherein determining the second cluster state comprises receiving the second cluster state from a controller.

11. The method of claim 8, further comprising:

diverting the packet received by the first border router by routing the packet from the owner border router in the first cluster using the network level consistent hash.

12. The method of claim 8, wherein generating the network level consistent hash based on the first cluster state and the second cluster state comprises generating a consistent hash table wherein a key to the consistent hash table comprises a five-tuple of the packet.

13. The method of claim 8, further comprising:

updating the network level consistent hash based on a determination that the first cluster state of the first cluster has changed; and updating the network level consistent hash based on a determination that the second cluster state of the second cluster has changed.

14. The method of claim 8, wherein:

the first cluster state is communicated to nodes within the first regional network by a first controller but not to nodes exclusively within the second regional network; and the second cluster state is communicated to nodes within the second regional network by a second controller but not to nodes exclusively within the first regional network.

15. One or more computer-readable non-transitory storage media embodying instructions that, when executed by a processor, cause the processor to perform operations comprising:

determining a first cluster state of a first plurality of border routers in a first cluster, wherein the first cluster is located between a core network and a first regional network;

determining a second cluster state of a second plurality of border routers in a second cluster, wherein the second cluster is located between the core network and a second regional network;

generating a network level consistent hash based on the first cluster state and the second cluster state;

receiving, by a first border router of the first plurality of border routers in the first cluster, a packet from a node in the first regional network;

selecting, from the first plurality of border routers and the second plurality of border routers, an owner border router using the network level consistent hash; and routing the packet to the owner border router.

16. The one or more computer-readable non-transitory storage media of claim 15, wherein determining the first cluster state of the first plurality of border routers in the first cluster comprises implementing a bidirectional forwarding detection protocol.

17. The one or more computer-readable non-transitory storage media of claim 15, wherein determining the second cluster state comprises receiving the second cluster state from a controller.

18. The one or more computer-readable non-transitory storage media of claim 15, the operations further comprising:

diverting the packet received by the first border router by routing the packet from the owner border router in the first cluster using the network level consistent hash.

19. The one or more computer-readable non-transitory storage media of claim 15, the operations further comprising:

updating the network level consistent hash based on a determination that the first cluster state of the first cluster has changed; and updating the network level consistent hash based on a determination that the second cluster state of the second cluster has changed.

20. The one or more computer-readable non-transitory storage media of claim 15, wherein:

the first cluster state is communicated to nodes within the first regional network by a first controller but not to nodes exclusively within the second regional network; and the second cluster state is communicated to nodes within the second regional network by a second controller but not to nodes exclusively within the first regional network.

* * * * *